(12) United States Patent
Deshmukh et al.

(10) Patent No.: US 8,290,972 B1
(45) Date of Patent: Oct. 16, 2012

(54) SYSTEM AND METHOD FOR STORING AND ACCESSING DATA USING A PLURALITY OF PROBABILISTIC DATA STRUCTURES

(75) Inventors: Vijay Deshmukh, Fremont, CA (US); Kiyoshi Komatsu, San Mateo, CA (US); Prashant Saraswat, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 447 days.

(21) Appl. No.: 12/432,541

(22) Filed: Apr. 29, 2009

(51) Int. Cl.
*G06F 7/00* (2006.01)

(52) U.S. Cl. ..................................... 707/758

(58) Field of Classification Search .................. 707/758
See application file for complete search history.

(56) References Cited

U.S. PATENT DOCUMENTS

| | | | |
|---|---|---|---|
| 5,434,994 A * | 7/1995 | Shaheen et al. | 709/223 |
| 7,702,683 B1 * | 4/2010 | Kirshenbaum | 707/758 |
| 2003/0078946 A1 * | 4/2003 | Costello et al. | 707/201 |
| 2005/0010615 A1 * | 1/2005 | Cypher et al. | 707/201 |
| 2007/0255758 A1 | 11/2007 | Zheng et al. | |
| 2008/0005141 A1 | 1/2008 | Zheng et al. | |
| 2008/0114756 A1 * | 5/2008 | Konig et al. | 707/5 |
| 2008/0294696 A1 * | 11/2008 | Frandzel | 707/200 |
| 2009/0157761 A1 * | 6/2009 | Yanagida | 707/201 |
| 2010/0332401 A1 * | 12/2010 | Prahlad et al. | 705/80 |

FOREIGN PATENT DOCUMENTS

WO  WO 2008/005211 A2  1/2008

OTHER PUBLICATIONS

Broder, Andrei and Mitzenmacher, Michael, "Network Applications of Bloom Filters: A Survey", Internet Mathematics, May 10, 2004, vol. 1, No. 4: pp. 485-509 (25 pages).
Broder, Andrei and Mitzenmacher, Michael, "Network Applications of Bloom Filters: A Survey", 11 pages.
Cameron, Pete, "Dedupe on Filers: The Good, The Bad and The (not very) Ugly", NetApp 2008, pp. 1-50.
Cao, Pei, "Bloom Filters-the math", available at : http://pages.cs.wisc.edu/~cao/papers/summary-cache/node8.html, Jul. 5, 1998, pp. 1-6.
Ceglowski, Maciej, "Using Bloom Filters", available at: httb://www.perl.com/lpt/a/831, Apr. 8, 2004, pp. 1-9.

(Continued)

*Primary Examiner* — Tony Mahmoudi
*Assistant Examiner* — Muluemebet Gurmu
(74) *Attorney, Agent, or Firm* — Brinks Hofer Gilson & Lione

(57) ABSTRACT

A system and method are described for storing and accessing data using a plurality of probabilistic data structures. In one embodiment, a plurality of probabilistic data structures are identified, each probabilistic data structure being associated with at least one other probabilistic data structure. The plurality of probabilistic data structures each correspond to a portion of a storage device storing a dataset. The dataset may include a plurality of values, such as a plurality of data blocks. A plurality of keys may be generated from the plurality of values, such as a plurality of fingerprints. Each key may be inserted into the probabilistic data structures which correspond to the portion of the storage device storing the value the key was generated from. The plurality of probabilistic data structures are stored in a memory and may be queried with an item to determine if the item exists in the plurality of probabilistic data structures.

29 Claims, 10 Drawing Sheets

OTHER PUBLICATIONS

Chapa, David, "Choosing the Right Backup Technology", NetApp Tech OnTap 2008, 4 pages.
Chapman, Darrin, "Tackle the Top Three VMWare Backup Challenges", NetApp Tech OnTap 2008, 4 pages.
Dharmapurikar, Sarang, Krishnamurthy Praveen, and Taylor, David E., "Longest Prefix Matching using Bloom Filters," SIGCOMM'03, Aug. 25-29, 2003, Karlsruhe Germany, ACM, 12 pages.
Dillinger, Peter C. and Panagiotis, Manolios, "Bloom Filters in Probabilistic Verification", Georgia Institute of Technology College of Computing, CERCS, pp. 1-15.
Dillinger, Peter C. and Manolios, Panagiotis, "Fast and Accurate Bitstate Verification for SPIN", Georgia Institute of Technology College of Computing, CERCS, pp. 1-19.
Duxbury, Bryan, "Engineering Rapleaf-Bloom Filters", available at: http://blog.rapleaf.com/dev/?p=6, pp. 1-2.
Freeman, Larry, "How Safe is Deduplication?", NetApp Tech OnTap 2008, 2 pages.
Gregorio, Joe, "BitWorking—Bloom Filter Resources", available at: http://bitworking.org/news/380/bloom-filter-resources, Oct. 19, 2008, pp. 1-6.
Jaspreet, "Understanding Data Deduplication", available at: http://blog.druva.com/2009/01/09/understanding-data-deduplication, Jan. 9, 2009, pp. 1-10.
Lewis, Blake, "Deduplication Comes of Age", available at: http://www.netapp.com/us/communities/tech-ontap/dedupe-0708.html, downloaded on Mar. 18, 2009, pp. 1-3.
Osuna, Alex, "IBM System Storage N series A-SIS Deduplication", Redbooks, created or updated on Mar. 13, 2009, pp. 1-76.
Osuma, Alex, IBM System Storage N series A-SIS Deduplication Deployment and Implementation Guide, Redpaper, 2007, pp. 1-30.
Ripeanu, Matei and Iamnitchi, Adriana, "Bloom Filters—Short Tutorial", pp. 1-4.
Singh, Jaspreet, "Data Deduplication—A Detailed Overview", Artipot, available at: http://www.artipot.com/articles/266989/data-deduplication-a-detailed-overview.htm, Jan. 14, 2009, 3 pages.
"Bit Array", Wikipedia, available at: http://en.wikipedia.org/wiki/Bit_array, last modified on Mar. 14, 2009, pp. 1-6.
"Bloom filter", Wikipedia, available at: http://en.wikipedia.org/wiki/Bloom_filter, last modified on Mar. 18, 2009, pp. 1-11.
"Bloom Filters", (powerpoint presentation), available at: http://www.cs.tau.ac.il/~hanoch/Courses/DS/DS-bloom-filter%5B1%5D.ppt, downloaded on Mar. 19, 2009, pp. 1-15.
"Deduplication Frequently Asked Questions", datadomain, available at: http://datadomain.com/resources/faq.html, copyright 2003-2009, downloaded on Feb. 19, 2009, pp. 1-4.
"Hash function", Wikipedia, available at: http://en.wikipedia.org/wiki/Hash_function, last modified on Mar. 14, 2009, pp. 1-9.
"Hash Table with Preemptive Bloom Filter", My Biased Coin, available at: http://mybiasedcoin.blogspot.com/2009/02/hash-table-with-preemptive-bloom-filter.html; Feb. 27, 2009, pp. 1-4.
"Introduction and Overview of Deduplication", NetApp Deduplication for FAS and V-Series Deployment and Implementation Guide, pp. 4-6 (3 pages).
"NetApp Deduplication for FAS Deployoment and Implementation Guide", NetApp Technical Report TR-3505, Sep. 2008, pp. 1-40.
"Scalable Datasets: Bloom Filters in Ruby", igvita.com, available at: http://www.igvita.com/2008/12/27/scalable-datasets-bloom-filters-in-ruby/, Dec. 27, 2008, pp. 1-7.
"Tech OnTap Special Edition: Backup and Recovery", NetApp Tech OnTap 2008, 1 page.
"Technical Overview of NetApp SnapDrive," Network Appliance, Inc., TR-3197, Apr. 2007, pp. 1-12.
"IBM System Storage N series Storage Optimization", IBM Corporation, Aug. 28, 2007, pp. 1-22.

\* cited by examiner

| 300B → | 0 | 0 | 1 | 0 | 0 | 0 | 1 | 0 | 0 | 0 | 0 | 1 |
| 300C → | 1 | 0 | 1 | 1 | 0 | 0 | 1 | 0 | 0 | 1 | 0 | 1 |
| 300D → | 1 | 0 | 1 | 1 | 1 | 0 | 1 | 0 | 1 | 1 | 0 | 1 |

SYSTEM AND METHOD FOR STORING AND ACCESSING DATA USING A PLURALITY OF PROBABILISTIC DATA STRUCTURES

BACKGROUND

In a large file system, it is common to find duplicate occurrences of individual blocks of data. Duplication of data blocks may occur when, for example, two or more files or other data containers share common data, or where a given set of data occurs at multiple places within a given file. Duplication of data blocks results in inefficient use of storage space by storing the identical data in a plurality of differing locations served by a storage system.

One technique that has been used to address this problem is to allow new data of a storage volume to share a data block with old data of the storage volume if the new data is identical to the old data. This technique may be performed on a storage volume by a process referred to as deduplication. In one example, a deduplication process may generate a hash, referred to as a fingerprint, of each data block stored on a storage volume. The fingerprints of the data blocks are stored in a data structure, such as a hash table or a flat file, which is referred to as a fingerprint database. When a new data block is to be stored, a fingerprint of the new data block is generated. The fingerprint is then compared with the fingerprint database containing the fingerprints of previously-stored blocks. If the new data block's fingerprint is identical to that of a previously-stored block, there is a high degree of probability that the new block is identical to the previously-stored block. In this case, a byte-by-byte comparison may be performed on the previously-stored data block and the new data block to determine if the data blocks are identical. If the data blocks are identical, the new block is replaced with a pointer to the previously-stored block, thereby reducing storage resource consumption.

However, existing data structures may not be optimal for storing the fingerprint database, particularly for storage systems in which the fingerprints have a high locality of reference, such as backup storage systems. A disadvantage of existing data structures is that the order of the fingerprints stored in the fingerprint database may not correspond to the order of the corresponding data blocks on the file system, e.g. two sequential fingerprints in the fingerprint database may not correspond to two sequential data blocks on the storage system. Thus, fingerprints can not effectively be pre-fetched and cached from the fingerprint database, but instead may be read individually. Since backup storage volumes may frequently be very similar, it may be desirable to pre-fetch and cache fingerprints of sequential data blocks during a deduplication operation of a backup storage volume.

Furthermore, storage systems may include increased data storage per disk head and increased computer processing unit cores and memory to service the disk heads. However, the amount of time required for the disk head to perform a random disk access has not improved. Thus, it may be desirable for storage systems to minimize random disk accesses, even at the expense of processing and/or memory resources. Therefore, there may be a need for a data structure for storing fingerprints which is capable of minimizing random disk accesses during a deduplication operation.

BRIEF DESCRIPTION OF THE DRAWINGS

FIGS. 3A-D are illustrations of a Bloom filter used to store and access data of an embodiment.

FIG. 4 is an illustration of a dynamic Bloom filter used to store and access data of an embodiment.

DETAILED DESCRIPTION

Figure 1:
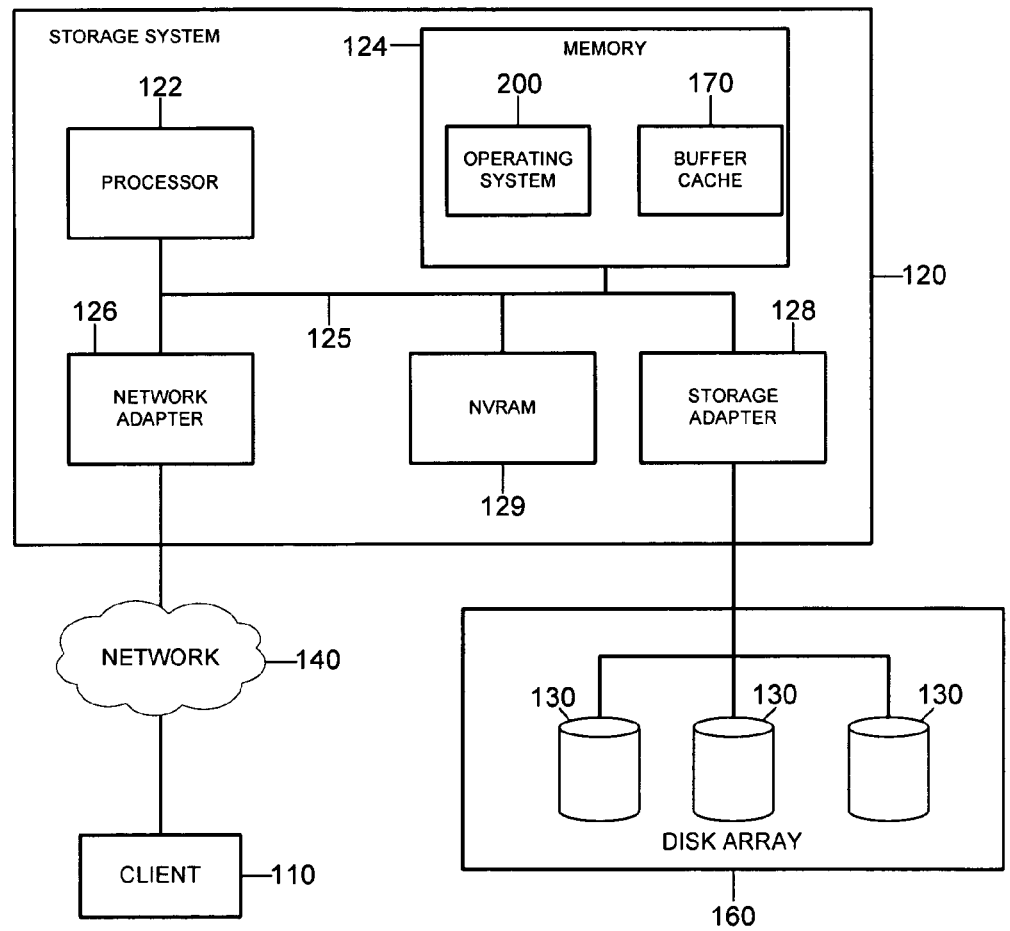
FIG. 1 is a block diagram of an exemplary network environment of an embodiment.

In these embodiments, a system is presented for storing and accessing data using a plurality of probabilistic data structures, which provides an advantage over the prior systems by providing a data structure for storing a fingerprint database which can be indexed in accordance with the storage location of the data block corresponding to each fingerprint, such as on a storage device. This allows sequential fingerprints to be pre-fetched into memory when a fingerprint is retrieved, or at the start of a deduplication process, without requiring the fingerprints to be periodically sorted. Allowing sequential fingerprints to be pre-fetched into memory can greatly reduce the number of random disk accesses required by a deduplication operation, particularly in backup storage systems where the fingerprints often have a high locality of reference. Reducing the number of random disk accesses required by a deduplication operation may greatly improve the efficiency of the operation.

The system in these embodiments enables storing and accessing data, such as in a fingerprint database, using a plurality of probabilistic data structures which are associated with one another, such as in a tree-like structure. The plurality of probabilistic data structures may each be associated with a portion of the disk space used to store a storage volume. The probabilistic data structures located at the top of the tree-like structure may be associated with a large portion of the disk space, while the probabilistic data structures located at the bottom of the tree-like structure may be associated with a small portion of the disk space, such as the disk space required to store a single data block. The fingerprints may be inserted into each of the probabilistic data structures which are associated with the disk space where the data block corresponding to each fingerprint is stored. The probabilistic data structures at the bottom level may be associated with a data buffer storing the fingerprint and an identifier identifying the location of the data block on the disk, such as an offset. The plurality of probabilistic data structures may be stored in memory and may then be queried to determine whether an item, such as a received fingerprint, exists in the fingerprint database.

The plurality of probabilistic data structures may be used to reduce the number of random disk accesses required by a deduplication operation. The deduplication operation may generate a fingerprint of a data block being deduplicated. The deduplication operation may query one or more of the plurality of probabilistic data structures to determine whether the fingerprint exists in the fingerprint database. If the fingerprint exists in the fingerprint database, the plurality of probabilistic data structures may return the fingerprint and the location of the corresponding data block on the disk. The deduplication operation may cache the plurality of probabilistic data structures containing the fingerprint and a plurality of sequential fingerprints, from the disk. The plurality of sequential fingerprints may be used in subsequent deduplication operations. Alternatively, all of the plurality of probabilistic data structures may be cached when the deduplication operation begins if sufficient memory resources are available. The deduplication operation may retrieve the data block from the disk which corresponds to the retrieved fingerprint and may compare the retrieved data block with the data block being deduplicated. If the data block being deduplicated is a duplicate of the stored data block, the deduplication operation may deduplicate the data block. Otherwise, the deduplication operation may store the data block on the disk.

Other systems, methods, features and advantages may be, or may become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Turning now to the drawings, FIG. 1 provides a general overview of an illustrative network environment 100 of an embodiment for storing and accessing data using a plurality of probabilistic data structures. Not all of the depicted components may be required, however, and some implementations may include additional components. Variations in the arrangement and type of the components may be made without departing from the spirit or scope of the claims as set forth herein. Additional, different or fewer components may be provided.

The network environment 100 includes a server 120 which may provide a service relating to the organization of information on storage devices, such as disks 130 of a disk array 160. The server 120 may be a computer that provides file and/or block based services relating to the organization of information on the disks 130. The server 120 and the disks 130 may be connected to a common communication and data transfer infrastructure, such as Fibre Channel, and may collectively comprise a storage area network (SAN). The server 120 may provide information stored on the storage devices in response to file access requests and/or block based access requests. The embodiments described herein can apply to any type of server 120, whether implemented as a special-purpose or general-purpose computer, including a standalone computer. The server 120 includes a processor 122, a memory 124, a network adapter 126, a non-volatile random access memory (NVRAM) 129 and a storage adapter 128, interconnected by a system bus 125. The server 120 may also include an operating system 200 that implements a file system to logically organize the information as a hierarchical structure of directories and files on the disks 130, such as the Data ONTAP™ operating system available from NetApp, Inc., of Sunnyvale, Calif. Each "on-disk" file may be implemented as a set of disk blocks configured to store information, such as text, whereas the directory may be implemented as a specially-formatted file in which information about other files and directories are stored.

The memory 124 includes storage locations that are addressable by the processor 122 for storing software program code, such as computer executable instructions. A portion of the memory 124 may be further organized as a "buffer cache" 170 for caching data structures in the memory 124, such as part or all of a fingerprint database. Alternatively, the NVRAM 129 may be utilized to store a fingerprint database or any other data structures utilized by the server 120. The processor 122 may include processing elements and/or logic circuitry configured to execute the software program code and to store and/or access data in the data structures. Portions of the operating system 200 are often resident in memory 124 and executed by the processor 122. Alternatively or in addition, other processing and memory elements, including various computer readable media, may be used for storing and executing program instructions. The operating system 200 functionally organizes the server 120 by, inter alia, invoking storage operations in support of a file service provided by the server 120.

The network adapter 126 includes the mechanical, electrical, and signaling circuitry needed to connect the server 100 to a client 110 over a network 140, which may include a point-to-point connection or a shared medium, such as a local area network (LAN), a wide area network (WAN), or a virtual private network (VPN) utilizing communication links over the internet. For example, the network 140 may be embodied as an Ethernet network or a Fibre Channel (FC) network. The client 110 may communicate with the server 120 over network 140 by exchanging data according to pre-defined protocols, such as the Transmission Control Protocol/Internet Protocol (TCP/IP), User Datagram Protocol (UDP), Hyper Text Transport Protocol (HTTP), Simple Network Management Protocol (SNMP), or Virtual Interface Connections (VI).

The client 110 may be a general-purpose computer configured to execute computer-executable instructions, such as software applications. Moreover, the client 110 may interact with the server 120 in accordance with a client/server model of information delivery. The client 110 may request the services of the server 120, and the server 120 may return the results of the services requested by the client 110 over the network 140. The client 110 may communicate requests using file-based access protocols, such as the Common Internet File System (CIFS) protocol or Network File System (NFS) protocol, over TCP/IP when accessing information in the form of files and directories. Alternatively, the client may communicate requests using block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the operating system 200 executing on the server 120 to access information requested by the client 110. The information may be stored on disks 130, such as hard disk drives (HDDs) and/or direct access storage devices (DASDs), of array 160. Alternatively or in addition, the information may be stored on any type of storage device such as video tape, optical, magnetic tape, bubble memory, hard disk, computer readable medium, electronic random access memory, micro-electro mechanical, flash memory, and any other similar media adapted to store information, including data and parity information. The storage adapter 128 includes input/output (I/O) interface circuitry that couples to the disks 130 over an I/O interconnect arrangement, such as a high-performance, FC serial link topology. The information requested by the client 110 is retrieved by the storage adapter 128 and, if necessary, processed by the processor 122 (or the adapter 128 itself). The information is then forwarded over the system bus 125 to the network adapter 126, where information is formatted according to the access protocol of the client 110 and returned to the client 110.

Figure 2:
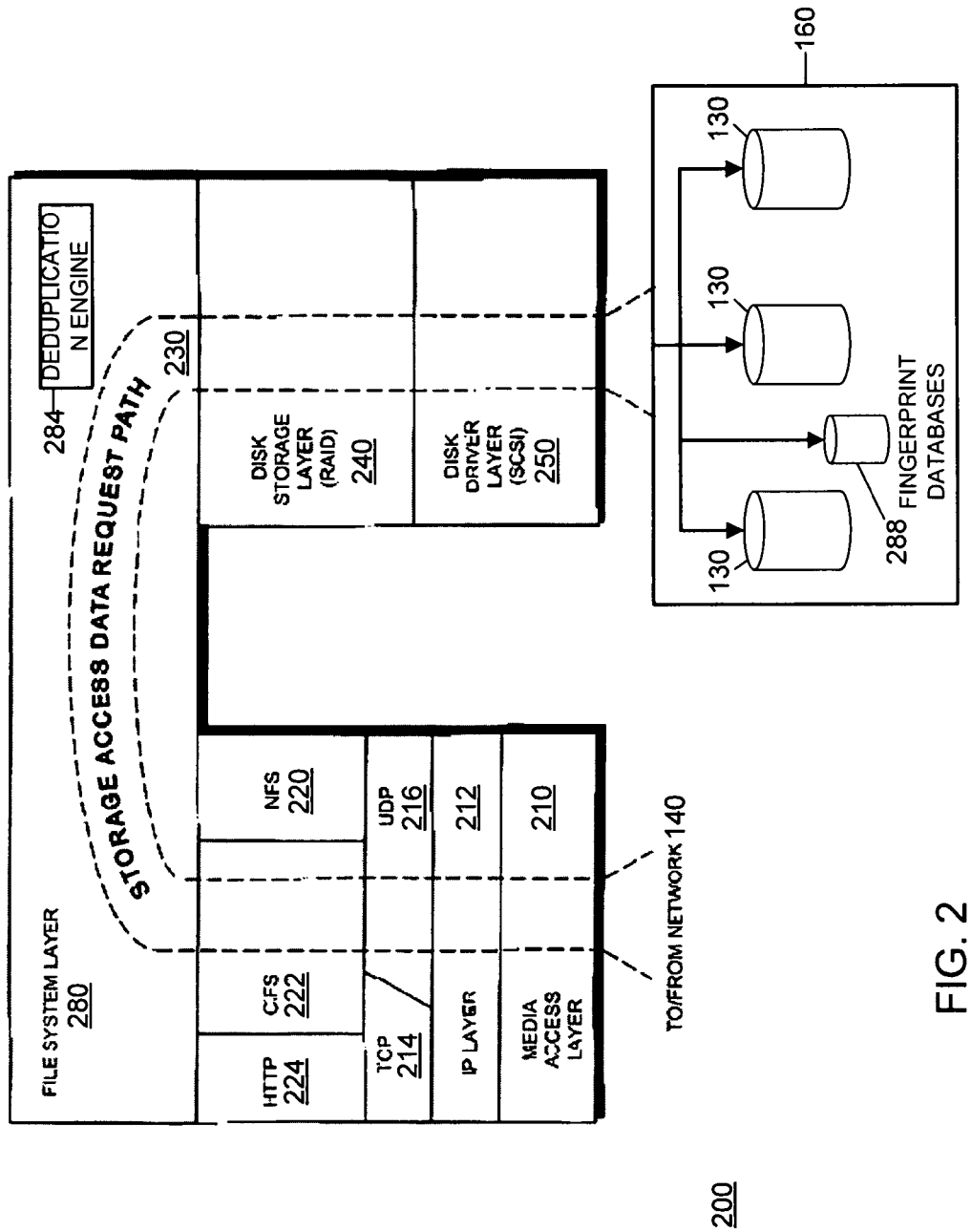
FIG. 2 is a block diagram of an exemplary operating system implemented by the file server of FIG. 1.

FIG. 2 is a block diagram of an exemplary operating system 200 implemented by the server 120 of FIG. 1. Not all of the depicted components may be required, however, and some implementations may include additional components. Variations in the arrangement and type of the components may be made without departing from the spirit or scope of the claims as set forth herein. Additional, different, or fewer components may be provided.

The operating system 200 includes a series of software layers organized to provide data paths for clients 110 to access information stored on the disks 130 using block and file access protocols. The software layers include a media access layer 210 of network drivers (e.g., gigabit Ethernet drivers). The software layers further include network protocol layers, such as the IP layer 212 and its supporting transport mechanisms, the TCP layer 214 and the User Datagram Protocol (UDP) layer 216. A file system protocol layer provides multi-protocol file access and includes support for the NFS protocol 220, the CIFS protocol 222, and the Hypertext Transfer Protocol (HTTP) protocol 224. In addition, the storage operating system 200 includes a disk storage layer 240 that implements a disk storage protocol, such as a RAID protocol, and a disk driver layer 250 that implements a disk access protocol such as a Small Computer System Interface (SCSI) protocol.

A file system layer 280 bridges the disk software layers with the network and file system protocol layers. For example, the file system layer 280 may implement a file system having an on-disk format representation that is block-based using, e.g., 4-kilobyte (KB) data blocks and using index nodes (inodes) to identify files and file attributes, such as creation time, access permissions, size, and block location. The block location information may include a memory address which references the physical data block on the disks 130. All of the inodes may be organized into an inode file which is stored by the file system layer 280.

One example of a file system is a write-anywhere file system that does not overwrite data on disks. If a data block is retrieved (read) from disk 130 into memory 124 of the server 120 and "dirtied" (i.e., updated or modified) with new data, the data block is thereafter stored (written) to a new location on disk 130 to optimize write performance. A write-anywhere file system may initially assume an optimal layout such that the data is substantially contiguously arranged on disks 130. The optimal disk layout results in efficient access operations, particularly for sequential read operations, directed to the disks 130. An example of a write-anywhere file system that is configured to operate on a storage system is the Write Anywhere File Layout (WAFL™) file system available from NetApp, Inc., of Sunnyvale, Calif.

The operating system 200 further includes a deduplication engine 284 which communicates with one or more fingerprint databases 288. The deduplication engine 284 may execute a deduplication operation periodically, in response to a predefined condition (e.g., the storage system reaching a predefined capacity), and/or in response to a command from a client 110. Alternatively or in addition, the deduplication engine 284 may execute a deduplication operation as data is received by the server 120, which may be referred to as an inline deduplication.

The one or more fingerprint databases 288 are often stored on the array of disks 160 where the storage volumes 130 are stored. However, the fingerprint databases 288 may often be stored outside of the storage volumes 130 in order to achieve higher space savings when performing a deduplication operation on the storage volumes 130. Alternatively, the one or more fingerprint databases 288 may reside in the memory 124 or NVRAM 129 of the server 120. The deduplication engine 284 may store a fingerprint database for each storage volume stored on the disks 130. For example, if a backup operation creates a backup volume of a dataset on a daily basis, the deduplication engine 284 may generate a separate fingerprint database 288 for each backup volume. The fingerprint databases 288 may store a fingerprint record of each data block stored in the storage volume. The fingerprint record may include a hash of each data block, referred to as a fingerprint, and an identifier of the data block on the disk 130, such as an offset or a file block number (fbn) field.

In a read operation, a read request from the client 110 may be communicated over the network 140 to the server 120, where it is received at the network adapter 126. The file system layer 280 may generate operations to load (retrieve) the requested data from disk 130 if it is not resident "in core," i.e., in the buffer cache 170. If the information is not stored in the buffer cache 170, the file system layer 280 indexes into the Mode file using the Mode number to access an appropriate entry and retrieve a logical location of the information. The file system then passes a message structure including the logical location to the disk storage layer 240. The disk storage layer 240 retrieves the disk identifier and disk block number mapped to the logical location, which is sent to an appropriate driver (e.g., SCSI) of the disk driver layer 250. The disk driver layer 250 accesses the disk block number from the specified disk 130 and loads the requested data block(s) in buffer cache 170 for processing by the server 120. Upon completion of the request, the storage server 120 communicates a response to the client 110 over the network 140.

In a write operation, a write request from the client 110 to the server 120 follows the same "path" through the operating system 200 layers, except that the deduplication engine 284 may extract data from the data block to be written in order to generate a fingerprint record for the data block. The fingerprint may be compared against the fingerprint database 288 to determine whether the received data block is a duplicate. If the deduplication engine 284 is operating in an inline deduplication mode, the deduplication engine 284 may deduplicate the data blocks as they are received by the server 120. That is, the received data may be deduplicated before writing the data to the disks 130.

In a deduplication operation, when a new data block is received by the deduplication engine 284, a fingerprint for the data block may be generated and compared with the fingerprints in the fingerprint database 288. If the fingerprint already exists in the fingerprint database 288, then the data block may be a duplicate data block and the deduplication engine 284 may perform a byte-by-byte comparison of the data blocks to verify that the received data block is a duplicate. If the byte-by-byte comparison verifies that the received data block is a duplicate, the deduplication engine 284 may deduplicate the data block. If the data block is not a duplicate, the new data block may be written to the disk 130. The deduplication engine 284 may then add a fingerprint record to the fingerprint database 288 of the storage volume corresponding to the received data block.

The storage access request data path 230 needed to perform data storage access for the client requests received by the server 120 alternately may be implemented in software executed on a programmable processor, hardware, or a combination of hardware and software. That is, in an alternative embodiment, the storage access request data path 230 may be implemented as logic circuitry embodied, for example, within a microprocessor or controller, like a programmable gate array or an application specific integrated circuit (ASIC). A hardware implementation may increase the performance of the file service provided by the server 120 in response to a file system request issued by the client 110.

FIGS. 3A-D are illustrations of Bloom filters 300A-D used to store and access data in an embodiment. The Bloom filters 300A-D may be space-efficient probabilistic data structures used to test whether an element is a member of a set represented by each Bloom filter 300A-D. The Bloom filters 300A-D consists of two components: a set of k hash functions and a bit vector of a length m. The length of the bit vector m, and the number of hash functions k, are chosen based on the number of keys n to be added to the set and an acceptable error rate c, which are discussed in more detail below. Although the Bloom filters 300A-D may not produce false negatives, the Bloom filters 300A-D may produce false positives. That is, a Bloom filter 300A may falsely identify an item as being a member of the set represented by the Bloom filter 300A when in fact it is not. The error rate identifies the percentage of false positives produced by the Bloom filter 300A. False positives may not be a concern in a deduplication operation because data blocks are compared byte-by-byte to verify that the data blocks are duplicates. Thus, any false positives would be caught by the byte-by-byte comparison. However, the byte-by-byte comparisons may be time consuming so it may be beneficial to minimize the error rate.

The hash functions of the Bloom filters 300A-D are configured such that their range matches the length of the bit vector. For example, if the Bloom filter 300A includes a bit vector which is 200 bits long, the hash functions preferably return a value between 1 and 200. Generally any hash functions may be used in the Bloom filters 300A-D, however, the hash functions preferably equally distribute their output across the bit vector to minimize the number of false positives. Some examples of a hash function may include a 32-bit checksum, a 64-bit checksum, and a Message-Digest algorithm 5 (MD5).

To insert a key into a Bloom filter 300A, the key is inputted to each of the k hash functions, and the output is used as an offset in the bit vector. The bit at the offset identified by the hash function is turned on, or set to 1. If the bit is already set to 1, then it is left unchanged. There may be no mechanism in a Bloom filter for turning off a bit, or setting a bit to 0. Therefore, there may be no inherent mechanism for removing a key from a Bloom filter.

For example, FIG. 3A illustrates an empty Bloom filter 300A with a bit vector of length 12 and three hash functions, "hash1," hash2," and "hash3." Since the Bloom filter 300A is empty, all of the bits of the bit vector are set to 0. To insert an item to the Bloom filter 300A, such as the string "fingerprint1" the string may be passed through each of the hash functions. For example, assume hash1("fingerprint1")=7, hash2("fingerprint1")=12 and hash3("fingerprint1")=3, then the bits corresponding to 7, 12, and 3 are turned on in the bit vector of the Bloom filter 300A. FIG. 3B illustrates the Bloom filter 300B after adding the string "fingerprint1" to the Bloom filter 300A. The bits in the bit vector of the Bloom filter 300B corresponding to the offsets of 7, 12, and 3 have been set to 1.

To add another key, such as the string "fingerprint2," the hashing procedure is repeated with the new string. For example, assume hash1("fingerprint2")=10, hash2("fingerprint2")=1, and hash3("fingerprint2")=4, then the bits corresponding to 10, 1, and 4 are turned on in the bit vector of the Bloom filter 300B. FIG. 3C illustrates the Bloom filter 300C after adding the string "fingerprint2" to the Bloom filter 300B. The bits in the bit vector of the Bloom filter 300C corresponding to the offsets of 10, 1, and 4 have been set to 1.

A third key may be added, such as the string "fingerprint3," by again repeating the hashing procedure for the new string. For example, assume hash1("fingerprint3")=5, hash2("fingerprint3")=9, and hash3("fingerprint3")=7, then the bits corresponding to 5, 9, and 7 are turned on in the bit vector of the Bloom filter 300C. FIG. 3D illustrates the Bloom filter 300D after adding the string "fingerprint3" to the Bloom filter 300C. The bits in the bit vector of the Bloom filter 300D corresponding to the offsets of 5 and 9 have been set to 1. The bit corresponding to the offset of 7 was set to 1 when the string "fingerprint1" was added to the Bloom filter 300A, thus the bit does not have to be set again. Accordingly, the bit located at offset 7 is encoding the keys of both "fingerprint1" and "fingerprint3." Encoding multiple keys with each bit allows the Bloom filters 300A-D to remain compact and space-efficient. However, encoding multiple keys with the same bits also prevents any key from being removed from the filter. For example, in order to remove the key "fingerprint3" from the Bloom filter 300D, the bits at offsets 5, 9 and 7 would have to be set to 0. However, setting the bit at offset 7 equal to 0 would also effectively remove "fingerprint1" from the Bloom filter 300D. Thus, if a bit is turned off which corresponds to multiple keys, then multiple keys may effectively be removed from the Bloom filter 300D. A remove operation which accounts for bits corresponding to multiple keys is discussed in more detail in FIG. 9 below.

Querying the Bloom filter 300D to determine whether a key exists is analogous to adding a new key. The key being queried is inputted to each of the hash functions of the Bloom filter 300D. The output of the hash functions is used to check the corresponding bits in the bit vector of the Bloom filter 300D. If any of the bits are turned off, or set to 0, then the key does not exist in the set represented by the Bloom filter 300D. If all of the bits are turned on, or set to 1, then the key most likely exists in the set represented by the Bloom filter 300D. As previously mentioned, the Bloom filter 300D may produce false positives within a determined error rate. Thus, all of the bits being set to 1 may not necessarily mean the key exists in the set represented by the Bloom filter 300D.

The false positive rate may depend on the bit vector length and the number of keys stored in the filter. For example, the larger the size of the bit vector, the smaller the probability that all bits checked for a key may be on, unless the key actually exists in a Bloom filter 300D. The number of hash functions may also be a factor in the false positive rate. For example, if too few hash functions are used, there may not be enough discrimination between the keys. However, if too many hash functions are used, then a Bloom filter 300D may be very dense, increasing the chances of a false positive.

The false positive rate c for a Bloom filter 300D may be calculated by using the formula $c=(1-e^{-kn/m})^k$, where k is the number of hash functions, n is the number of keys in the filter, and m is the length of the filter in bits. Often, the acceptable false positive rate may be selected by an administrator depending on the use of the Bloom filters 300A-D. For example, the acceptable false positive rate for Bloom filters 300A-D used by a deduplication engine 284 to store a fingerprint database 288, may be 0.05%. If the acceptable false positive rate c, the number of hash functions k, and the number of keys in the filter n are already known, then the following equation can be used to determine the size of the bit vector:

$$m = \frac{-kn}{\ln(1-c^{1/k})}.$$

These equations may be used to determine the size and number of hash functions for a Bloom filter when the number of keys and acceptable error rate are known.

Table 1 below provides values determined for the acceptable false positive rate c using the equation for c above, given the number of hash functions k, and a ratio m/n of the length of the filter in bits m and the number of keys to be inserted into each Bloom filter n:

TABLE 1

| m/n | k | k = 1 | k = 2 | k = 3 | k = 4 | k = 5 | k = 6 |
|---|---|---|---|---|---|---|---|
| 2 | 1.39 | 0.393 | 0.4 | | | | |
| 3 | 2.08 | 0.283 | 0.237 | 0.253 | | | |
| 4 | 2.77 | 0.221 | 0.155 | 0.147 | 0.16 | | |
| 5 | 3.46 | 0.181 | 0.109 | 0.092 | 0.092 | 0.101 | |
| 6 | 4.16 | 0.154 | 0.0804 | 0.0609 | 0.0561 | 0.0578 | 0.0638 |
| 7 | 4.85 | 0.133 | 0.0618 | 0.0423 | 0.0359 | 0.0347 | 0.0364 |
| 8 | 5.55 | 0.118 | 0.0489 | 0.0306 | 0.024 | 0.0217 | 0.0216 |
| 9 | 6.24 | 0.105 | 0.0397 | 0.0228 | 0.0166 | 0.0141 | 0.0133 |

If the acceptable false positive rate for the particular implementation of the Bloom filters 300A-D has been identified, such as by an administrator, the minimal number of hash functions k and the ratio m/n can be chosen from the values in Table 1. The values for k and m/n may be selected to minimize either k or m/n, depending upon the use of the Bloom filters 300A-N. For example, if the Bloom filters 300A-N are used in a fingerprint database 288, the m/n value should be minimized so that the size of the Bloom filters 300A-N are minimized. Minimizing the size of the Bloom filters 300A-N may allow more of the Bloom filters 300A-N to be simultaneously cached in memory 124. For example, if the acceptable error rate c is 0.05, then the number of hash functions k may be 3, and the m/n value may be 7. The steps of determining the size and number of hash functions for a Bloom filter 300A are discussed in more detail in FIG. 6 below.

FIG. 4 is an illustration of a dynamic Bloom filter 400 used to store and access data of an embodiment. The dynamic Bloom filter 400 may include a plurality of Bloom filters, such as the Bloom filters 300B-D. The dynamic Bloom filter 400 may be thought of as having rows of Bloom filters 300B-D. The dynamic Bloom filter 400 may expand as a dataset grows by adding a new Bloom filter. New data may be inserted to the dynamic Bloom filter 400 at the current or last row of Bloom filters. The memory needed for the dynamic Bloom filter 400 can be dynamically allocated as needed. The rows of the dynamic Bloom filter 400 may be loaded into memory 124 as needed. Alternatively, the entire dynamic Bloom filter 400 may be cached into memory 124. A query operation on the dynamic Bloom filter 400 may query each of the Bloom filters 300B-D in parallel to determine if the key exists in any of the individual Bloom filters 300B-D.

Figure 5:
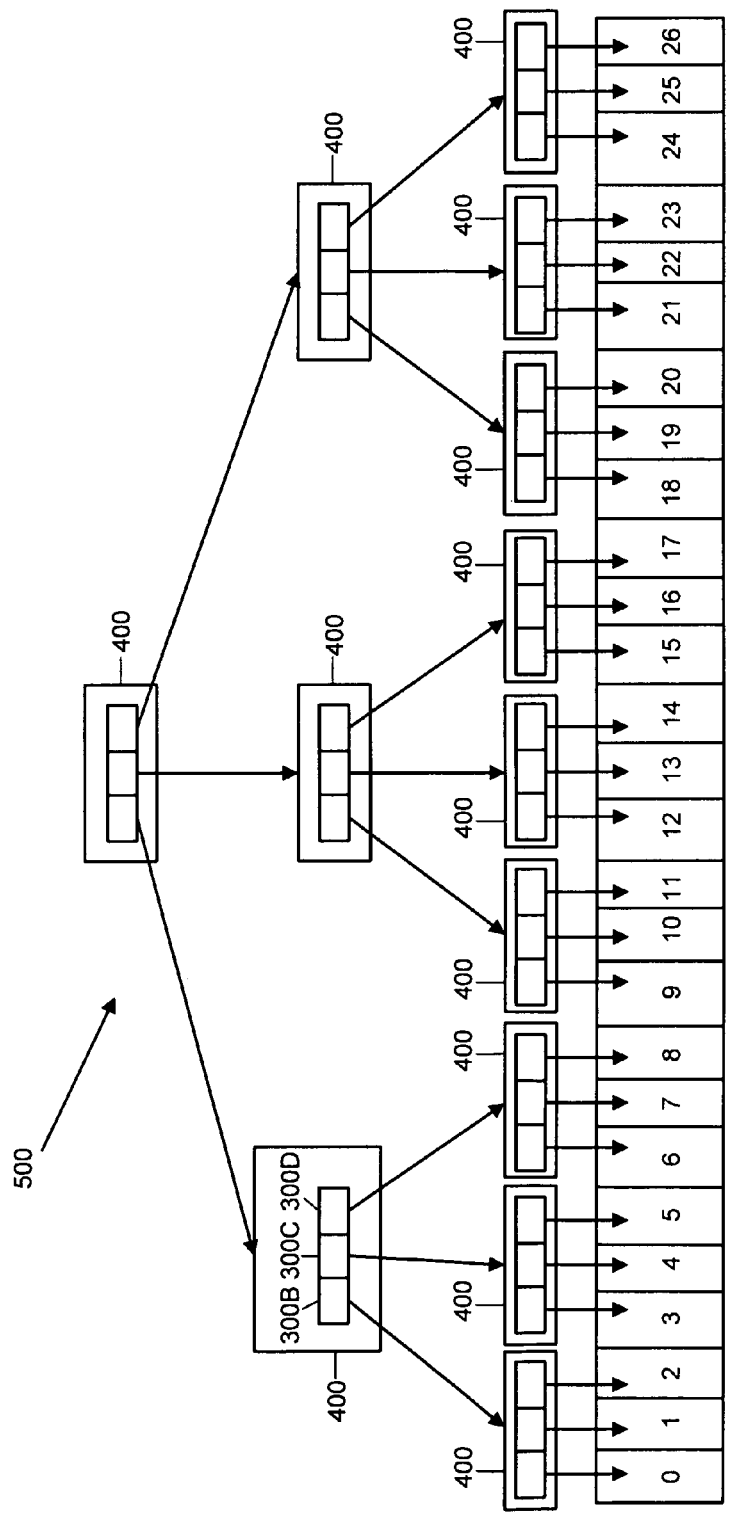
FIG. 5 is an illustration of a probabilistic tree-like data structure used to store and access data of an embodiment.

FIG. 5 is an illustration of a probabilistic tree-like data structure 500 used to store and access data of an embodiment. The probabilistic tree-like data structure 500 may include a plurality of dynamic Bloom filters 400. The dynamic Bloom filters 400 may be linked together as nodes of a tree-like data structure. Each of the dynamic Bloom filters 400 may represent a portion of a dataset, where the actual data is stored at the last level of the probabilistic tree-like data structure 500. The last level of the probabilistic tree-like data structure 500 may refer to the leaf level of the probabilistic tree-like data structure 500, and the first level of the probabilistic tree-like data structure 500 may refer to the root level of the probabilistic tree-like data structure 500. For example, in FIG. 5, the probabilistic tree-like data structure 500 may store twenty-seven key-value pairs, such as a fingerprint database 288 containing twenty-seven fingerprints and locations of the data blocks represented by the fingerprints.

In FIG. 5, the keys may be identified by the numbers of 0-26, which each may be associated with a value, such as the location of the data blocks, stored at the leaf level. The top level of the probabilistic tree-like data structure 500 may include a dynamic Bloom filter 400 representing all of the keys 0-26. The dynamic Bloom filter 400 may include three individual Bloom filters, which may each represent an equal portion of the keys, keys 0-8, keys 9-17, and keys 18-26, respectively. The second level of the probabilistic tree-like data structure 500 may include three dynamic Bloom filters 400. The first dynamic Bloom filter 400 may represent keys 0-8, the second dynamic Bloom filter 400 may represent keys 9-17, and the third dynamic Bloom filter 400 may represent keys 18-26. The first dynamic Bloom filter 400 may include the Bloom filters 300B-D. Each of the Bloom filters 300B-D may represent an equal portion of the keys represented by the Bloom filter 400. For example, the Bloom filter 300B may represent keys 0-2, the Bloom filter 300C may represent keys 3-5, and the Bloom filter 300D may represent keys 6-8. The last level of the probabilistic tree-like data structure 500, referred to as the leaf level, may include nine dynamic Bloom filters 400. Each dynamic Bloom filter 400 at the last level may include three Bloom filters. The Bloom filters at the last level may be associated with a buffer storing a single key-value pair. Alternatively or in addition, the last level of Bloom filters may represent multiple keys; that is, there may not be a one-to-one relation between the last level of Bloom filters and the keys. As illustrated by FIG. 5, each dynamic Bloom filter 400 located at the top of the probabilistic tree-like data structure 500 represents a larger portion of the keys than each dynamic Bloom filter 400 located at the bottom of the probabilistic tree-like data structure 500. The operations of building the probabilistic tree-like data structure 500 are discussed in more detail in FIG. 6 below.

The probabilistic tree-like data structure 500 may be used to store fingerprints. For example, the probabilistic tree-like data structure 500 may be used as a fingerprint database 288 of a storage volume 130. Thus, the probabilistic tree-like data structure 500 is often stored on the array of disks 160 where the storage volumes 130 are stored. However, the probabilistic tree-like data structure 500 may often be stored outside of the storage volumes 130 in order to achieve higher space savings when performing a deduplication operation on the storage volumes 130. Alternatively, the probabilistic tree-like data structure 500 may reside in the memory 124 or NVRAM 129 of the server 120. The fingerprint database 288 may store fingerprints of data blocks of the storage volume, and a location of the data blocks on the storage volume, such as an offset. The deduplication engine 284 may populate the fingerprint database 288 by reading a data block, generating a fingerprint of the data block, and storing the fingerprint and an identifier of the data block in the probabilistic tree-like data structure 500. The fingerprints may be inserted into the probabilistic tree-like data structure 500 in depth-first order, i.e., each fingerprint is inserted into the first available Bloom filter at each level. When the fingerprints are inserted in depth-first order, each Bloom filter not only represents a portion of the fingerprints in the fingerprint database 288, but also a portion of the storage volume containing the data blocks the fingerprints were generated from.

For example, the deduplication engine 284 may read the first data block in a storage volume and generate a fingerprint for the first data block. The fingerprint may be inserted into the first Bloom filter of the dynamic Bloom filter 400 at the top level. The fingerprint would then be inserted into the Bloom filter 300B of the dynamic Bloom filter 400 at the second level. Lastly, the fingerprint would be inserted into the first Bloom filter of the first dynamic Bloom filter 400 on the last level. Thus, the first Bloom filter 300B may represent both the first three fingerprints in the fingerprint database 288 and the first three data blocks of the storage volume the fingerprints were generated from.

Since a fingerprint may be inserted into a Bloom filter on each level, inserting an item into the probabilistic tree-like data structure 500 may take a constant time for a given depth d of the probabilistic tree-like data structure 500. The depth of the probabilistic tree-like data structure 500 may refer to the number of levels in the probabilistic tree-like data structure 500. The operations of inserting a fingerprint into the probabilistic tree-like data structure 500 are discussed in more detail in FIG. 7 below.

Querying the probabilistic tree-like data structure 500 to determine if a key exists in the tree-like data structure 500 may take a constant time for a given number of Bloom filters at the top level of the probabilistic tree-like data structure 500. Finding a queried item may require traversing the tree depth first. For example, a key may first be queried with all of the Bloom filters on the top level. The key may then be queried with all the Bloom filters on the next level corresponding to a Bloom filter on the top level which reported a match. This process may continue down the probabilistic tree-like data structure 500 until reaching the Bloom filters on the last level. In the example of a fingerprint database 288 used in a backup storage system, the fingerprints being queried may generally arrive in the order of the data blocks of the storage volume being deduplicated. Thus, part or all of the probabilistic tree-like data structure 500 may be pre-fetched into the memory 124 in depth first order in order to reduce the number of random disk accesses. The operations of querying the probabilistic tree-like data structure 500 are discussed in more detail in FIG. 8 below.

The probabilistic tree-like data structure 500 allows a server 120 to trade off memory 124 and processor 122 resources for reduced random disk accesses. The insertions to the probabilistic tree-like data structure 500 are performed in memory; therefore, the probabilistic tree-like data structure 500 does not require random disk writes. Furthermore, because the fingerprints are inserted in depth-first order, the Bloom filters of the probabilistic tree-like data structure 500 corresponds to both the fingerprints and the data blocks of the storage volume represented by the fingerprints.

Figure 6:
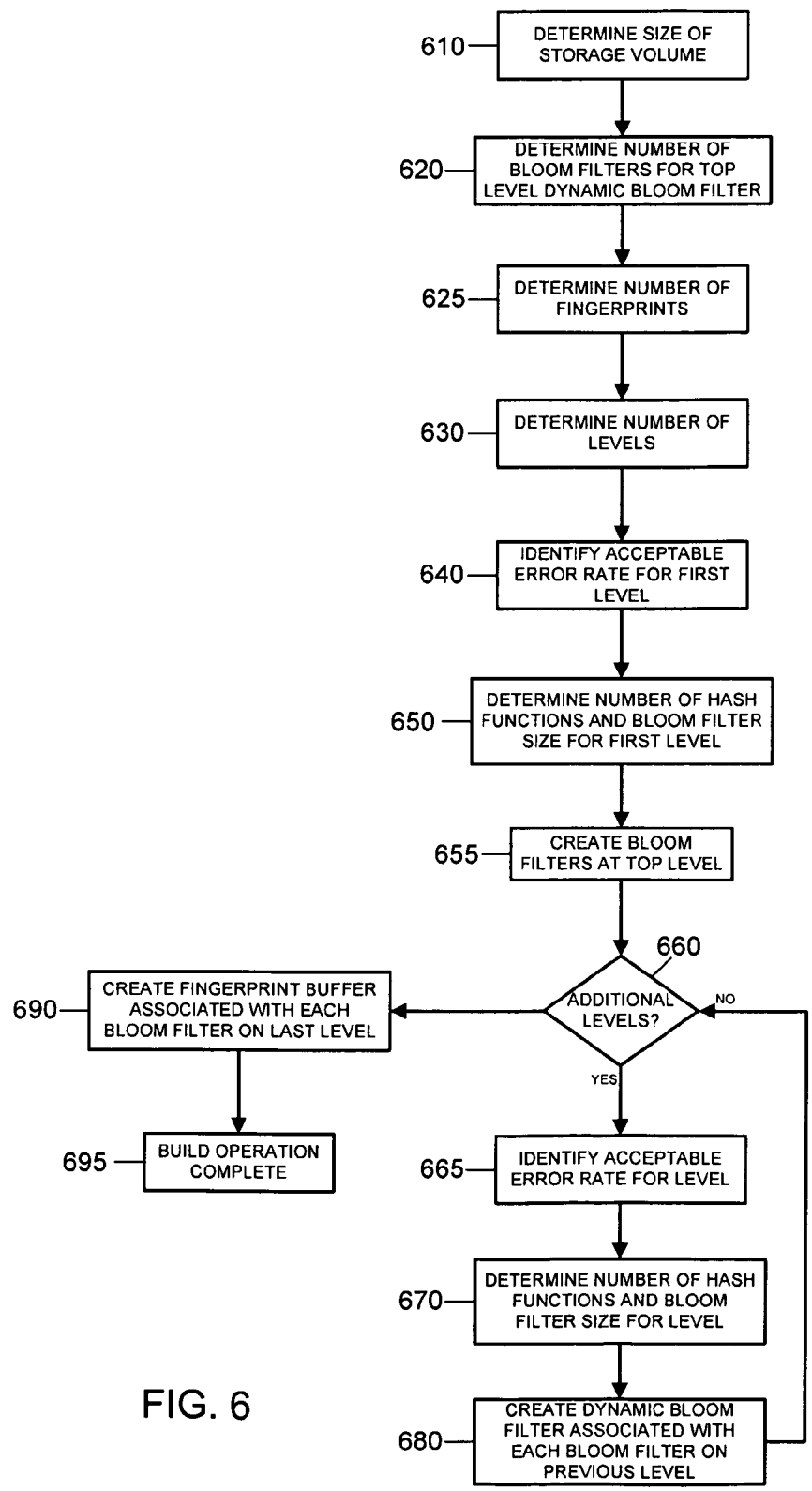
FIG. 6 is a flowchart illustrating a build tree operation of an embodiment.

FIG. 6 is a flowchart illustrating a build tree operation of an embodiment. The steps of FIG. 6 are explained in reference to an exemplary database, the fingerprint database 288. However, the steps of FIG. 6 may be performed in reference to any underlying dataset stored on a disk 130. Furthermore, the steps are described as being performed by deduplication engine 284. However, the steps may be performed by any process of the operating system 200, the processor 124 or any hardware component of the server 120, or by an external hardware component or software process.

At step 610, the deduplication engine 284 determines the size of the storage volume being deduplicated. The size of the storage volume may be determined by measuring the amount of disk space occupied by the storage volume, for example two terabytes (TB). At step 620, the deduplication engine 284 determines the number of Bloom filters which may be included in the dynamic Bloom filter at the top level of the probabilistic tree-like data structure 500. The number of Bloom filters may be determined based on the portion of the storage volume each Bloom filter may be associated with. Each top level Bloom filter may often be associated with twenty gigabytes (GB) of the storage volume. Thus, if the storage volume is two terabytes, and each top level Bloom filter is associated with twenty gigabytes, there may be one hundred top level Bloom filters.

As shown in Table 1 and the equations of FIG. 4 above, the size of each Bloom filter may increase as the portion of the storage volume associated with each Bloom filter increases. The size of the Bloom filter increases because the number of fingerprints inserted into the Bloom filter may increase as the portion of the storage volume associated with each Bloom filter increases. Since it may be desirable to cache all of the top level Bloom filters into memory, the amount of available memory may impact the portion of the storage volume associated with each top level Bloom filter. The number of Bloom filters in the dynamic Bloom filters of subsequent levels of the probabilistic tree-like data structure 500 may be equal to the number of Bloom filters in the top level dynamic Bloom filter. Alternatively, the number of Bloom filters in the dynamic Bloom filters of each level may differ from level to level of the probabilistic tree-like data structure 500.

At step 625, the deduplication engine 284 determines the number of fingerprints to be stored in the probabilistic tree-like data structure 500. Since a fingerprint is generated for each data block on a storage volume, the number of fingerprints to be stored in the probabilistic tree-like data structure 500 is equal to the number of data blocks on the storage volume. For example, if the storage volume is 2TB, and if each data block is 64 kilobytes (KB), then there may be 32,768,000 fingerprints stored in the probabilistic tree-like data structure 500.

At step 630, the deduplication engine 284 determines the number of levels of the probabilistic tree-like data structure 500. The number of levels may be determined based on the number of fingerprints to be stored in the probabilistic tree-like data structure 500, and any time constraints for a query operation or insert operation on probabilistic tree-like data structure 500. As mentioned above, the insertion time and query time may increase with each additional level added to the probabilistic tree-like data structure 500. Three levels of the probabilistic tree-like data structure 500 are often sufficient for a fingerprint database 288.

In addition, the number of levels may also be determined based on the number of fingerprints to be associated with each Bloom filter on the last level of the probabilistic tree-like data structure 500. Since a search may need to be performed on the data buffer storing the fingerprints on the last level, it may be desirable to minimize the number of fingerprints associated with each Bloom filter on the last level. However, each Bloom filter on the last level of the probabilistic tree-like data structure 500 may be associated with at least one data block in the storage volume or one fingerprint.

For example, if the storage volume is 2TB, each data block is 64 KB, and there are 100 Bloom filters in each dynamic Bloom filter, then each Bloom filter on the first level may be associated with 20 GB of the storage volume. Since each Bloom filter on the first level is associated with 100 Bloom filters on the second level, each Bloom filter on the second level may be associated with 20 GB/100, or 200 megabytes (MB) of the storage volume. Since each Bloom filter on the second level is associated with 100 Bloom filters on the third level, each Bloom filter on the third level may represent 200 MB/100, or 2 MB of the storage volume. Since each data block is 64 KB, each Bloom filter on the third level may be associated with 2 MB/64 KB, or 32 fingerprints. If a fourth level is added to the probabilistic tree-like data structure 500, then each Bloom filter would be associated with 2 MB/100, or 20 KB. However, because each data block in the storage volume is 64 KB, each Bloom filter at the fourth level would not be associated with at least one data block. Therefore, the maximum number of levels in this example would be three, because the Bloom filters on a fourth level would be associated with a portion of the storage volume which is less than the size of one data block.

At step 640, the deduplication engine 284 may determine the acceptable error rate for the first level of Bloom filters. The acceptable error rate for the first level of Bloom filters may be implementation specific. For example, different implementations of the probabilistic tree-like data structure 500 may tolerate different error rates. The acceptable error rate for a top level of the probabilistic tree-like data structure 500 used for a fingerprint database 288 may often be five percent. Thus, five percent of the time the probabilistic tree-like data structure 500 may generate a false positive. Since the deduplication engine 284 may perform a byte-by-byte comparison of the data blocks of any matching fingerprints, five percent may be an acceptable number of false positives.

At step 650, the deduplication engine 284 may determine the number of hash functions and the Bloom filter size for each Bloom filter in the first level of the probabilistic tree-like data structure 500. As mentioned above, the number of hash functions k, and the Bloom filter size m, may be determined based on the number of fingerprints to be inserted into the Bloom filter n, and the acceptable error rate c. For example, if there are 100 Bloom filters on the top level and the acceptable error rate for the top level is 5%, then the acceptable error rate c for each Bloom filter is 5%/100, or 0.05% (0.0005). Once the acceptable error rate is determined, the equations of FIG. 4 above can be used to generate a table of k and m/n values, such as Table 1 above. The table can be used to select a k and m/n which minimizes the m/n value and is capable of achieving a c of 0.0005. For example, an m/n of 16 and a k of 9 are capable of achieving an error rate of 0.0005. Thus, the number of hash functions for each Bloom filter on the top level may be 9.

If each of the Bloom filters on the top level is associated with 20 GB of the storage volume, and if each data block on the storage volume is 64 KB, then there may be 20 GB/64 KB, or 327,680 fingerprints inserted into each Bloom filter on the top level. Thus, the value of n for the top level Bloom filters is 327,680. Since the m/n equals 16, and n equals 327,680, m can be determined by 16*327,680, which equals 5242880. Thus, the size of each Bloom filter at the top level may be 5242880 bits, or 640 KB.

At step 655, the deduplication engine 284 creates the Bloom filters at the top level. In the current example, the deduplication engine 284 creates 100 Bloom filters, the bit vector of each Bloom filter being 640 KB in size, and each Bloom filter including 9 hash functions. The hash functions preferably ensure that the outputted values are evenly distributed across the bit vectors of the Bloom filters. For example, a 64-bit checksum hash preferably provides adequate distribution for Bloom filters of most sizes; however, generally any hash function may be used, such as a 32-bit checksum hash function or an MD5 hash function. The Bloom filters may be stored in an indexable array which may represent the dynamic Bloom filter at the top level. In one example, each Bloom filter may be associated with a status, such as open, closed, or removed. The status of each Bloom filter may be set to open when each Bloom filter is created.

At step 660, the deduplication engine 284 may determine whether there are additional levels in the probabilistic tree-like data structure 500. The deduplication engine 284 may use the total number of levels, as determined in step 630, and the current level, to determine if there are any additional levels. If, at step 660, the deduplication engine 284 determines there are additional levels in the probabilistic tree-like data structure 500, the deduplication engine 284 moves to step 665. At step 665, the deduplication engine 284 identifies the acceptable error rate for the current level. The acceptable error rate may often be the same for each level. However, different acceptable error rates may be determined for each level. At step 670, the deduplication engine 284 determines the number of hash functions and the size of each Bloom filter on the current level. The deduplication engine 284 may follow the same process described in step 650 above.

At step 680, the deduplication engine 284 may create a dynamic Bloom filter associated with each Bloom filter on the previous level. The dynamic Bloom filter may often contain the number of Bloom filters determined in 620 above, such as 100 in the current example. Alternatively, the dynamic Bloom filters of each level may contain different numbers of Bloom filters. However, all of the dynamic Bloom filters of a given level preferably include the same number of Bloom filters. Each dynamic Bloom filter of the current level may be an indexable array of Bloom filters associated with a Bloom filter on the previous level, and all of the dynamic Bloom filters of the level may be stored in an indexable array. A dynamic Bloom filter may be associated with Bloom filters on one or more previous levels through the use of pointers. Alternatively, a dynamic Bloom filter may be logically associated with Bloom filters on one or more previous levels based on the index of the Bloom filters on the one or more previous levels, and the index of the dynamic Bloom filter. For example, the third Bloom filter on the first level may be associated with the third dynamic Bloom filter on the second level. In one example, each Bloom filter of each dynamic Bloom filter may be associated with a status, such as open, closed, or removed. The status of each Bloom filter may be set to open when each Bloom filter is created.

If, at step 660, the deduplication engine 284 determines that there are no additional levels in the probabilistic tree-like data structure 500, the deduplication engine 284 moves to step 690. At step 690, the deduplication engine 284 creates a data buffer associated with each Bloom filter on the last level. The data buffer may be used to store each fingerprint and offset value associated with the Bloom filter on the last level. For example, if there are thirty-two fingerprints stored on the last level, the data buffer may have space to store thirty-two fingerprints and thirty-two offsets. The memory may be dynamically allocated to the data buffer as each fingerprint and offset is stored in the probabilistic tree-like data structure 500. At step 695, the build operation is complete.

Figure 7:
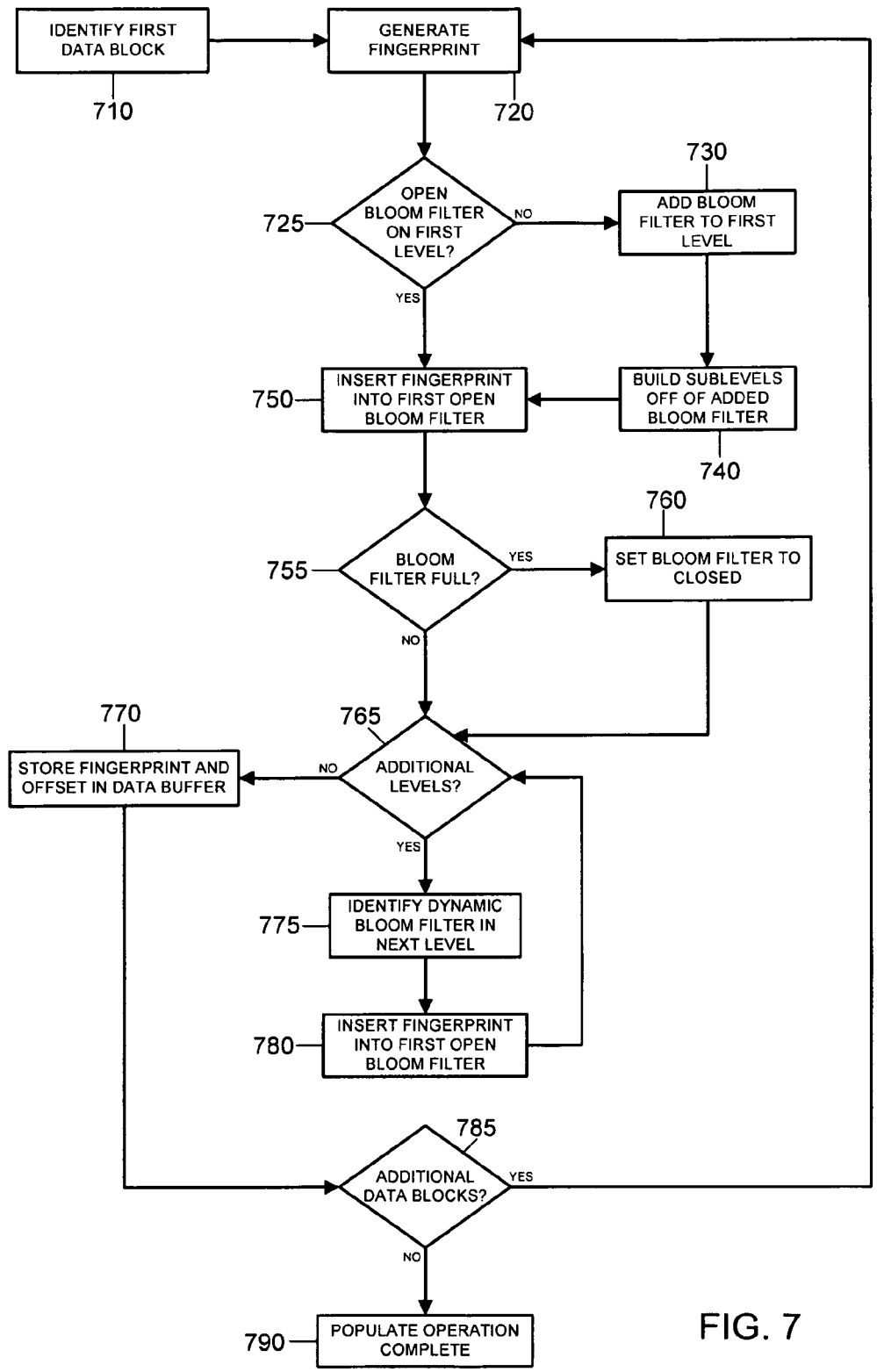
FIG. 7 is a flowchart illustrating a populate operation of an embodiment.

FIG. 7 is a flowchart illustrating a populate operation of an embodiment. The populate operation may be a series of insert operations on the probabilistic tree-like data structure 500. The steps of FIG. 7 are explained in reference to an exemplary database, the fingerprint database 288. However, the steps of FIG. 7 may be performed in reference to any underlying dataset stored on a disk 130. Furthermore, the steps are described as being performed by deduplication engine 284. However, the steps may be performed by any process of the operating system 200, the processor 124 or any hardware component of the server 120, or by an external hardware component or software process. The steps of FIG. 6 and FIG. 7 are described separately for explanatory purposes; however, in the steps of FIG. 6 and FIG. 7 may occur simultaneously, i.e. the probabilistic tree-like data structure 500 may be built as it is being populated.

At step 710, the deduplication engine 284 identifies the first data block in a storage volume being deduplicated. The deduplication engine 284 may process the storage volume in sequential order. Thus, the first data block identified by the deduplication engine 284 may be the first data block in the storage volume. At step 720, the deduplication engine 284 generates a fingerprint for the identified data block. At step 725, the deduplication engine 284 may determine whether an open Bloom filter exists on the first level of the probabilistic tree-like data structure 500. An open Bloom filter may refer to a Bloom filter that is not full. As mentioned above, the Bloom filters may be associated with a status indicating whether the Bloom filter is open, closed or removed. If, at step 725, the deduplication engine 284 determines that there is not an open Bloom filter on the first level, the deduplication engine 284 moves to step 730. At step 730, the deduplication engine 284 adds a Bloom filter to the dynamic Bloom filter at the first level. The Bloom filter may be created with the same error rate, size, and number of hash functions used to create the other Bloom filters on the first level. At step 740, the deduplication engine 284 builds the sublevels off of the first level Bloom filter, in accordance with steps 660-695 in FIG. 6 above.

If, at step 725, the deduplication engine 284 determines that there is an open Bloom filter on the first level, the deduplication engine 284 moves to step 750. At step 750, the deduplication engine inserts the fingerprint into the first open Bloom filter on the current level. The fingerprint may be inserted into the Bloom filter by inputting the fingerprint to each of the hash functions associated with the Bloom filter. At step 755, the deduplication engine 284 determines whether inserting the fingerprint into the Bloom filter caused the Bloom filter to become full. The deduplication engine 284 may identify if the current Bloom filter is full by determining whether the number of fingerprints inserted into the Bloom filter equals the number of fingerprints the Bloom filter was created to store. For example, if the Bloom filter was created to store 327,680 fingerprints, and 327,680 fingerprints have been inserted into the Bloom filter, then the Bloom filter is full. If, at step 755, the deduplication engine 284 determines that the Bloom filter is full, the deduplication engine 284 moves to step 760. At step 760, the deduplication engine 284 sets the status of the Bloom filter to closed, indicating that the Bloom filter is full.

At step 765, the deduplication engine 284 determines whether there are additional levels in the probabilistic tree-like data structure 500. The deduplication engine 284 may determine whether there are any additional levels in the probabilistic tree-like data structure 500 based on the total number of levels of the tree identified in FIG. 6, and the current level of the probabilistic tree-like data structure 500. If there are additional levels in the probabilistic tree-like data structure 500, the deduplication engine 284 moves to step 775.

At step 775, the deduplication engine 284 identifies the dynamic Bloom filter in the next level associated with the Bloom filter the fingerprint was inserted into on the current level. The dynamic Bloom filter on the next level may be determined based on the index of the Bloom filter on the current level, and the number of dynamic Bloom filters on the current level. For example, if there is 1 dynamic Bloom filter on the top level, which includes 100 Bloom filters, and the fingerprint is inserted into the thirtieth Bloom filter, then the deduplication engine 284 identifies the thirtieth dynamic Bloom filter in the next level. Alternatively, if there are 2 dynamic Bloom filters on the current level, each including 100 Bloom filters, and the fingerprint was inserted into the first Bloom filter of the second dynamic Bloom filter, then the deduplication engine identifies the one-hundred and first dynamic Bloom filter on the next level. At step 780, the deduplication engine 284 inserts the fingerprint into the first open Bloom filter of the dynamic Bloom filter identified in step 775. The deduplication engine 284 may repeat steps 765-780 for each additional level in the probabilistic tree-like data structure 500.

If, at step 765, the deduplication engine 284 determines there are no additional levels in the tree, the deduplication engine 284 moves to step 770. At step 770, the deduplication engine 284 stores the fingerprint and the identifier of the data block, such as a file offset, in the data buffer associated with the Bloom filter on the last level the fingerprint was inserted into. If, at step 785, there are no additional blocks in the storage volume, the deduplication engine 284 moves to step 790. At step 790, a fingerprint for each data block in the storage volume has been inserted into the probabilistic tree-like data structure 500, and the populate operation is complete.

Figure 8:
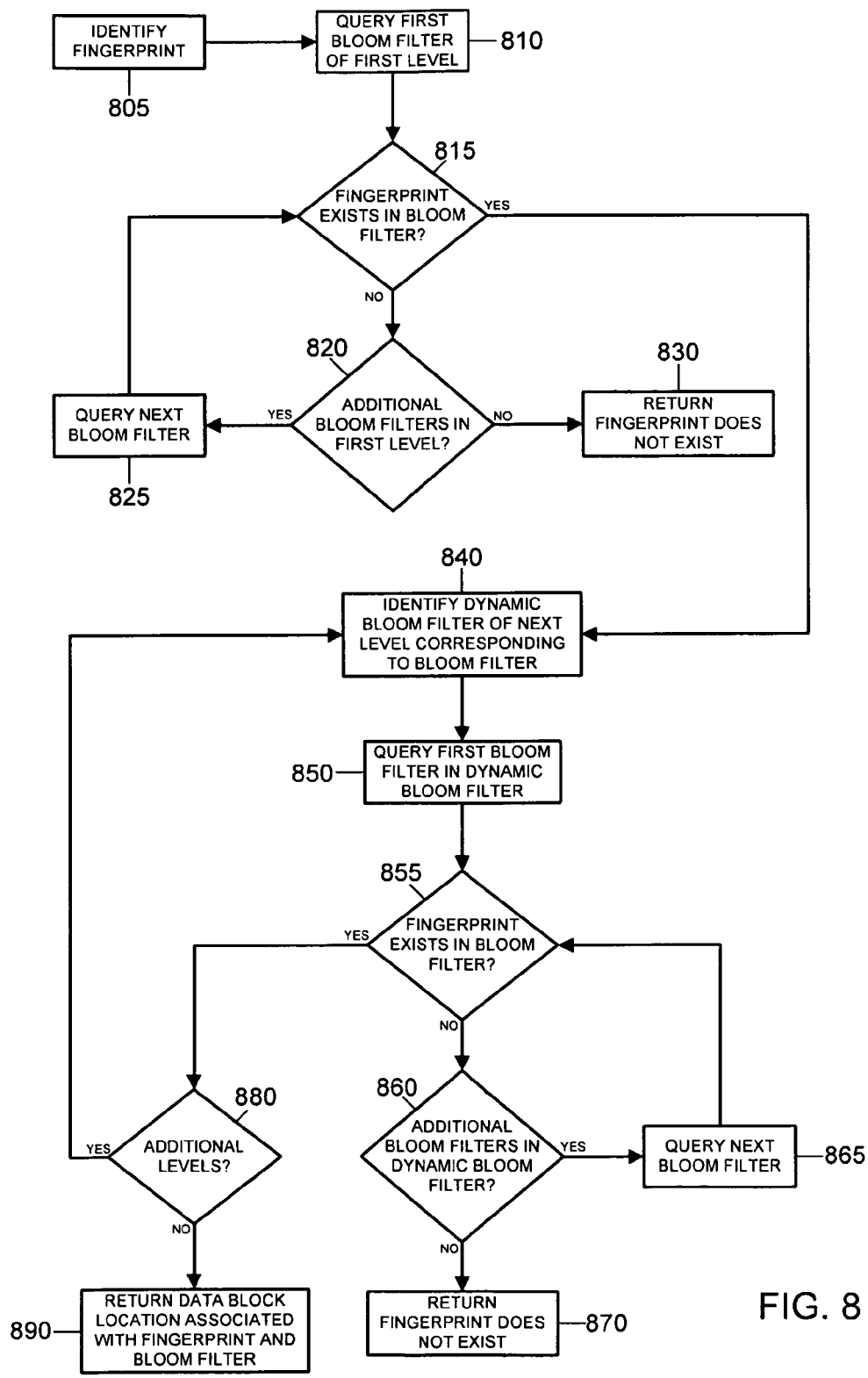
FIG. 8 is a flowchart illustrating a query operation of an embodiment.

FIG. 8 is a flowchart illustrating a query operation of an embodiment. The steps of FIG. 8 are explained in reference to an exemplary database, the fingerprint database 288. However, the steps of FIG. 8 may be performed in reference to any underlying dataset stored on a disk 130. Furthermore, the steps are described as being performed by deduplication engine 284. However, the steps may be performed by any process of the operating system 200, the processor 124 or any hardware component of the server 120, or by an external hardware component or software process.

At step 805, the deduplication engine 284 may identify a fingerprint to query the probabilistic tree-like data structure 500 with as part of a deduplication process. The fingerprint may be part of a change log generated by a storage volume, or the fingerprint may represent data being deduplicated in real-time. For example, a backup operation may be communicating data blocks to be stored in a backup volume to the deduplication engine 284 in order to deduplicate the data blocks prior to storing them on the disk 130. The deduplication engine 284 may generate a fingerprint for reach received data block.

At step 810, the deduplication engine 284 queries the first Bloom filter of the first level of the probabilistic tree-like data structure 500. The first Bloom filter may be queried by inputting the fingerprint to each of the hash functions of the Bloom filter. At step 815, the deduplication engine 284 determines whether the fingerprint exists in the Bloom filter. The fingerprint may exist in the Bloom filter if each of the hash functions of the Bloom filter returns a 1. If any of the Bloom filter functions returns a 0, then the fingerprint does not exist in the Bloom filter. If, at step 815, the deduplication engine 284 determines that the fingerprint does not exist in the Bloom filter, the deduplication engine 284 moves to step 820. At step 820, the deduplication engine 284 determines whether there are any additional Bloom filters in the first level. The deduplication engine 284 may use the total number of Bloom filters in the first level, as identified in FIG. 6 to determine if there are any additional Bloom filters in the first level. If there are additional Bloom filters in the first level, the deduplication engine 284 moves to step 825. At step 825, the deduplication engine 284 queries the next Bloom filter and returns to step 815. If, at step 820, the deduplication engine 284 determines that there are no additional Bloom filters in the first level, then the fingerprint does not exist in the probabilistic tree-like data structure 500, and the deduplication engine 284 moves to step 830. At step 830, the deduplication engine 284 returns information indicating that the fingerprint does not exist in the probabilistic tree-like data structure 500.

If, at step 815, the deduplication engine 284 determines that the fingerprint exists in the Bloom filter, the deduplication engine 284 moves to step 840. At step 840, the deduplication engine 284 identifies the dynamic Bloom filter of the next level associated with the Bloom filter in the previous level returning a match. For example, if there are 100 Bloom filters in the first row, and the thirtieth Bloom filter returns a match, then the thirtieth dynamic Bloom filter of the second row is identified. At step 850, the deduplication engine 284 queries the first Bloom filter of the dynamic Bloom filter identified in step 840. At step 855, the deduplication engine 284 determines whether the fingerprint exists in the queried Bloom filter. The deduplication engine 284 may determine whether the fingerprint exists in the queried Bloom filter in accordance with step 815 above.

If, at step 855, the deduplication engine determines the fingerprint does not exist in the Bloom filter, the deduplication engine 284 moves to step 860. At step 860, the deduplication engine determines if there are any additional Bloom filters in the current dynamic Bloom filter. The deduplication engine 284 may use the total number of Bloom filters in each dynamic Bloom filter identified in FIG. 6 to determine if there are any additional Bloom filters. If, at step 860, the deduplication engine 284 determines there are no additional Bloom filters, the deduplication engine 284 moves to step 870. At step 870, the deduplication engine 284 returns information indicating that the fingerprint does not exist in the probabilistic tree-like data structure 500.

If, at step 855, the deduplication engine 284 determines that the fingerprint exists in the current Bloom filter, the deduplication engine 284 moves to step 880. At step 880, the deduplication engine 284 determines whether there are additional levels in the tree. The deduplication engine 284 may use the total number of levels determined in FIG. 6 and the current level to determine whether there are any additional levels. If, at step 880, the deduplication engine 284 determines there are additional levels in the probabilistic tree-like data structure 500, the deduplication engine 284 moves to step 840. The deduplication engine repeats steps 840-880 for each additional level of the probabilistic tree-like data structure 500.

If, at step 880, the deduplication engine determines there are no additional levels in the probabilistic tree-like data structure 500, the deduplication engine moves to step 890. At step 890, the deduplication engine 284 returns the fingerprint and offset associated with the Bloom filter on the last level in which the fingerprint existed in. The Bloom filter on the last level may be associated with several fingerprint and data block location pairs. In the example used in FIG. 6 above, each Bloom filter was associated with 32 fingerprints and data block locations. In this case, the deduplication engine 284 searches the fingerprints associated with the Bloom filter to identify the matching fingerprint. The data block location associated with the matching fingerprint is then returned. The deduplication engine 284 may retrieve the data block identified by the data block location and perform a byte-by-byte comparison on the data blocks to verify that the data blocks are duplicates.

If the deduplication is being performed on a backup volume, the deduplication engine 284 may cache in memory the portions of the probabilistic tree-like data structure 500 where the fingerprint existed. These portions of the probabilistic tree-like data structure 500 may correspond to fingerprints stored subsequent to the current fingerprint. For example, the deduplication engine 284 may cache each dynamic Bloom filter the fingerprint was queried in. Since backup volumes often do not change significantly, the data blocks of a backup volume generally arrive to the deduplication engine 284 corresponding to the order the fingerprints are stored in. Thus, by caching the portions of the probabilistic tree-like data structure 500 containing subsequent fingerprints, the deduplication engine 284 may not need to perform a random disk read for the retrieving the subsequent fingerprints.

The steps of querying the probabilistic tree-like data structure 500 have been explained as a serial process for explanatory purposes. However, the Bloom filters of the probabilistic tree-like data structure 500 may generally be queried in parallel. That is, each of the Bloom filters at the first level may be queried simultaneously. If there is a match to one or more of the first level Bloom filters, each of the Bloom filters on the next level may also be queried simultaneously. Since the Bloom filters may produce false positives, the parallel processes querying the probabilistic tree-like data structure 500 may determine that the fingerprint is stored at multiple block ranges. In this case, the deduplication engine 284 may perform a bit-by-bit comparison of the data blocks corresponding to each of the identified fingerprints to determine, which, if any, of the block ranges actually corresponds to a fingerprint corresponding to a duplicate data block.

Figure 9:
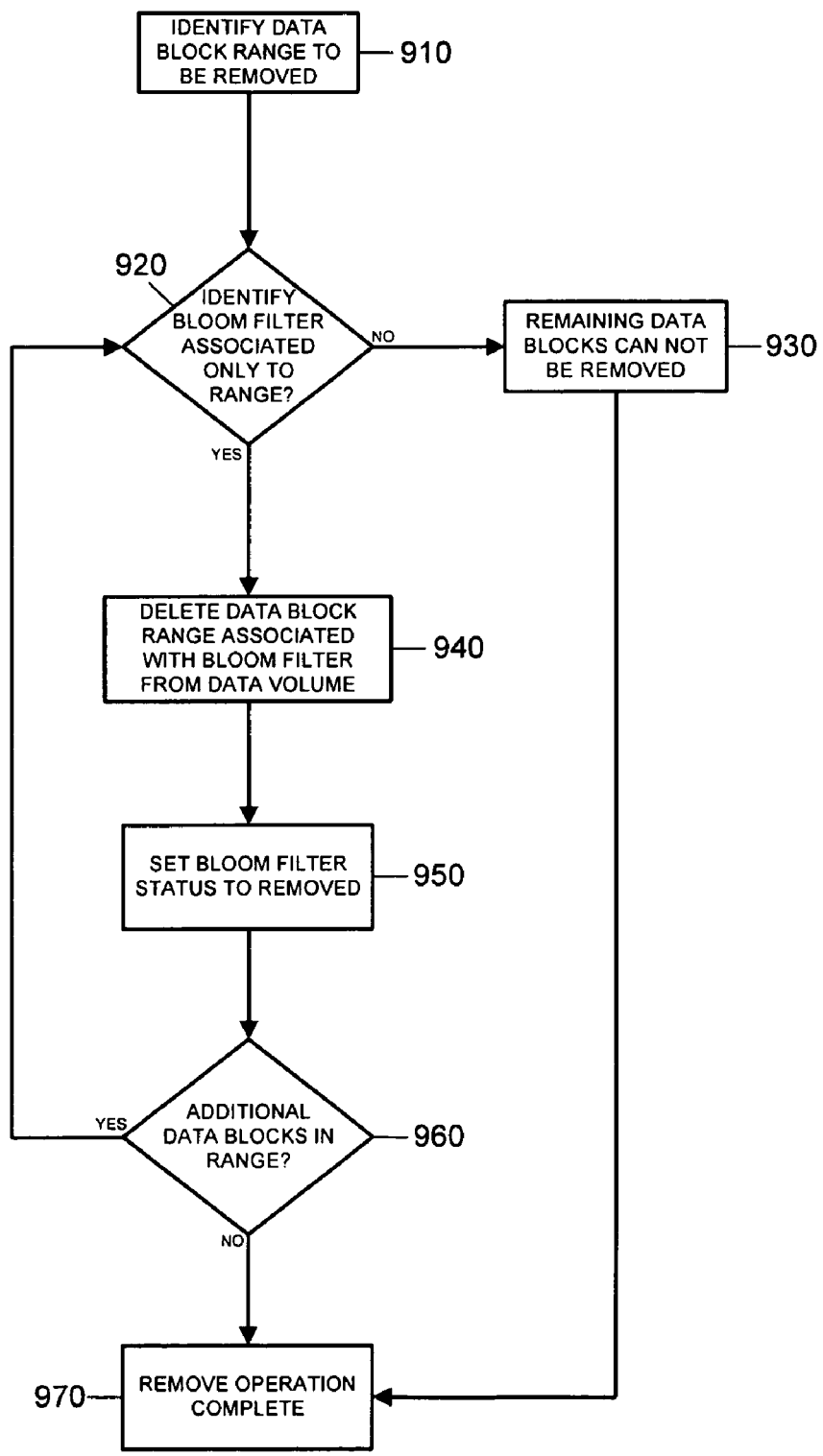
FIG. 9 is a flowchart illustrating a remove operation of an embodiment.

FIG. 9 is a flowchart illustrating a remove operation of an embodiment. The steps of FIG. 9 are explained in reference to an exemplary database, the fingerprint database 288. However, the steps of FIG. 9 may be performed in reference to any underlying dataset stored on a disk 130. Furthermore, the steps are described as being performed by deduplication engine 284. However, the steps may be performed by any process of the operating system 200, the processor 124 or any hardware component of the server 120, or by an external hardware component or software process.

At step 910, the deduplication engine 284 identifies the data block range which is being removed from the storage volume, which corresponds to the fingerprints being removed from the probabilistic tree-like data structure 500. At step 920, the deduplication engine 284 determines whether a Bloom filter exists in the probabilistic tree-like data structure 500, which only contains fingerprints relating to the data block range being removed. For example, the deduplication engine 284 may generate a fingerprint for the first data block being removed from the storage volume. The deduplication engine 284 may query the probabilistic tree-like data structure 500 with the fingerprint and identify the last level Bloom filter the fingerprint is associated with. The deduplication engine may retrieve all of the fingerprints associated with the last level Bloom filter. If all of the data blocks corresponding with the fingerprints associated with the last level Bloom filter are being removed, then the Bloom filter corresponds to all or part of the data block range being removed.

If, at step 920, the deduplication engine determines that a Bloom filter exists which is only associated with part or all of the data block range, the deduplication engine moves to step 940. At step 940, the deduplication engine 284 may delete the data block range from the storage volume corresponding to the Bloom filter. At step 950, the deduplication engine 284 may set the status of the Bloom filter to removed. The deduplication engine 284 may be configured to ignore any Bloom filters with a status of removed during query operations. At step 960, the deduplication engine 284 may determine whether there are additional data blocks to be deleted. If, at step 960, the deduplication engine 284 determines there are additional data blocks to be deleted, the deduplication engine 284 moves to step 920. The deduplication engine repeats steps 920-960 for the remaining data blocks to be deleted. If, at step 960, there are no additional data blocks to be deleted, the deduplication engine moves to step 970. At step 970, the remove operation is complete.

If, at step 920, the deduplication engine 284 determines that there is no Bloom filter in the probabilistic tree-like data structure 500 which is only associated with part or all of the data block range to be deleted, the deduplication engine 284 moves to step 930. At step 930, the deduplication engine 284 provides information indicating that the fingerprints corresponding to the remaining data blocks can not be removed, and thus, the data blocks should not be deleted from the storage volume. At step 970, the remove operation is complete.

Figure 10:
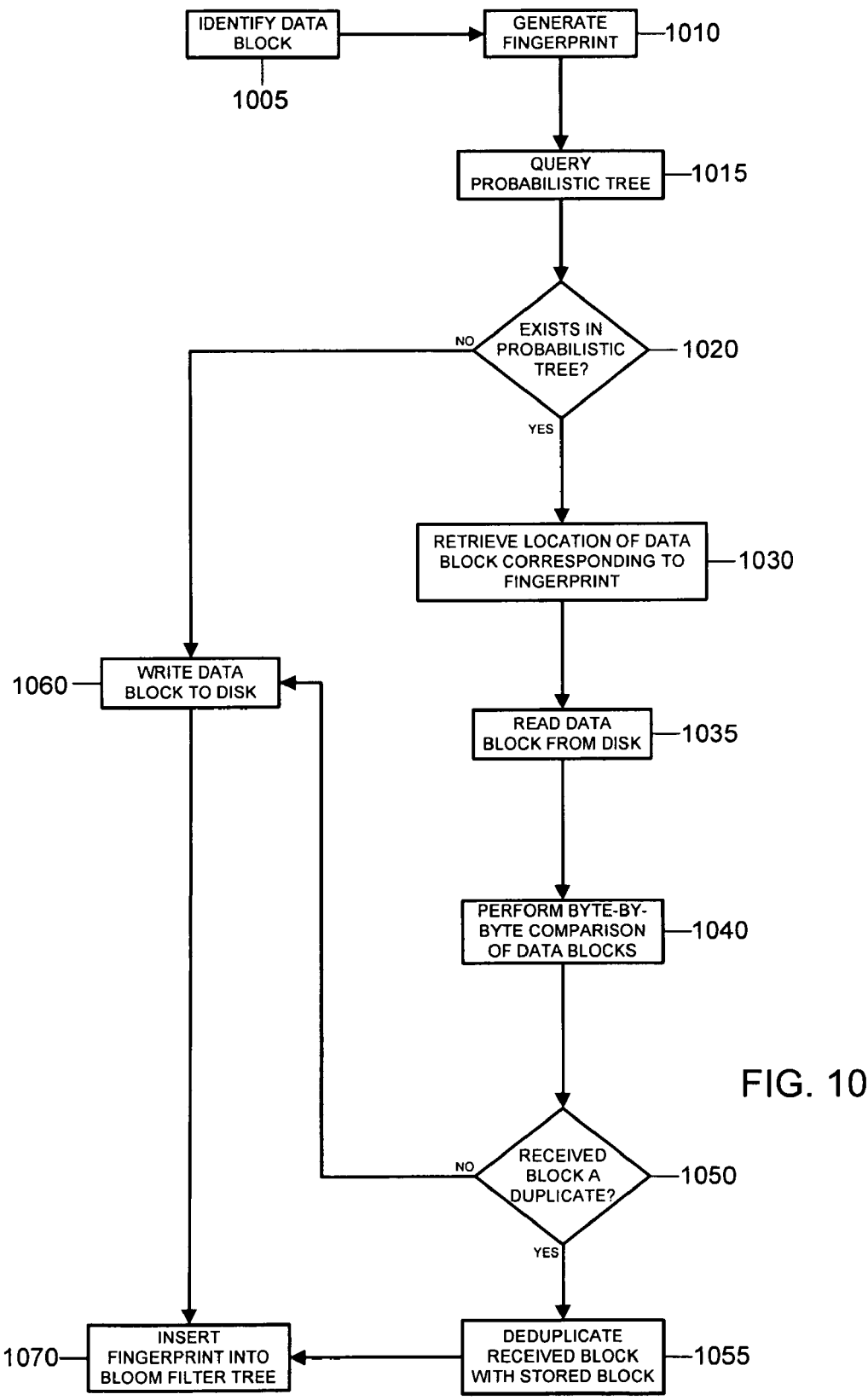
FIG. 10 is a flowchart illustrating a deduplication operation of an embodiment.

FIG. 10 is a flowchart illustrating a deduplication operation of an embodiment. The steps of FIG. 10 are described as being performed by deduplication engine 284. However, the steps of FIG. 10 may be performed by any process of the operating system 200, the processor 124 or any hardware component of the server 120, or by an external hardware component or software process.

At step 1005, the deduplication engine 284 identifies a data block to be deduplicated. The data block may be communicated to the deduplication engine 284 by a backup operation in order to deduplicate a storage volume prior to storing the data block on a disk 130. The deduplication engine 284 may deduplicate the received data blocks of the storage volume and generate a fingerprint database 288 for the storage volume. At step 1010, the deduplication engine 284 may generate a fingerprint for the data block. At step 1015, the deduplication engine 284 queries the probabilistic tree-like data structure 500 with the generated fingerprint. At step 1020, the deduplication engine 284 determines whether the fingerprint exists in the probabilistic tree-like data structure 500 based on the query performed on the probabilistic tree-like data structure 500. If the fingerprint exists in the probabilistic tree-like data structure 500, the deduplication engine 284 moves to step 1030.

At step 1030, the deduplication engine 284 retrieves the location of the data block corresponding to the fingerprint from the buffer associated with the last level Bloom filter containing the fingerprint. At step 1035, the deduplication engine 284 reads the data block from the disk 130 based on the location of the data block stored in the probabilistic tree-like data structure 500. At step 1040, the deduplication engine 284 performs a byte-by-byte comparison of the received data block and the data block corresponding to the fingerprint stored in the probabilistic tree-like data structure 500.

At step 1050, the deduplication engine 284 identifies whether the byte-by-byte comparison determined that the data blocks are duplicates. If, at 1050, the deduplication engine 284 identifies that the data blocks are duplicates, the deduplication engine 284 moves to step 1055. At step 1055, the deduplication engine 284 deduplicates the data blocks. At step 1070, the deduplication engine 284 inserts the fingerprint and the offset corresponding to the location of the data block, into a probabilistic tree-like data structure 500 for the backup storage volume.

If, at step 1050, the deduplication engine 284 identifies that the data blocks are not duplicates, or if, at step 1020, the deduplication engine 284 determines that the fingerprint does not exist in the probabilistic tree-like data structure 500, the deduplication engine 284 moves to step 1060. At step 1060, the deduplication engine 284 writes the data block to the disk 130. At step 1070, the deduplication engine 284 inserts the fingerprint and the offset corresponding to the location of the data block, into a probabilistic tree-like data structure 500 for the backup storage volume.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for storing and accessing data using a plurality of probabilistic data structures, the method comprising:
    identifying, by a processor, a dataset comprising a plurality of values stored on a storage device;
    assembling, by a processor, a plurality of probabilistic data structures, each probabilistic data structure being associated with at least one other probabilistic data structure in the plurality of probabilistic data structures, wherein the plurality of probabilistic data structures are associated to form a tree structure comprising a plurality of ordered levels, each level being associated with at least one of the plurality of probabilistic data structures, wherein each probabilistic data structure corresponds to a portion of the storage device storing the dataset;
    generating, by the processor, a plurality of keys corresponding to the plurality of values;
    inserting, by the processor, each key of the plurality of keys into each probabilistic data structure that corresponds to the portion of the storage device storing the value the key was generated from;
    storing, by the processor, the plurality of probabilistic data structures in memory; and
    querying, by the processor, a first probabilistic data structure of the plurality of probabilistic data structures with an item to determine whether the item exists in the first probabilistic data structure, and if the item exists in the first probabilistic data structure, then querying, by the processor, a second probabilistic data structure of the plurality of probabilistic data structures with the item to determine whether the item exists in the second probabilistic data structure.

2. The method of claim 1, wherein the plurality of keys comprise of a plurality of fingerprints and the plurality of values comprise of a plurality of data blocks stored on the storage device.

3. The method of claim 1, wherein each probabilistic data structure comprises a Bloom filter.

4. The method of claim 1, further comprising: associating, by the processor, each key and an offset identifying a location of the corresponding value on the storage device with the probabilistic data structure in a last ordered level of the plurality of ordered levels which corresponds to the portion of the storage device storing the value.

5. The method of claim 1, wherein a number of probabilistic data structures associated with each ordered level increases exponentially from level to level.

6. The method of claim 1, wherein each probabilistic data structure comprises a bit vector and at least one hash function.

7. The method of claim 6 wherein inserting each key of the plurality of keys into each probabilistic data structure of the plurality of probabilistic data structures further comprises inserting each key into each hash function of each probabilistic data structure.

8. The method of claim 6 wherein querying, by the processor, the plurality of probabilistic data structures with an item further comprises querying, by the processor, each hash function of each probabilistic data structure with the item.

9. The method of claim 6 wherein at least one hash function comprises a Message-Digest algorithm 5.

10. The method of claim 1, wherein the item comprises a fingerprint generated from a received data block.

11. The method of claim 1, wherein each probabilistic data structure is associated with a status describing a state of each probabilistic data structure.

12. The method of claim 11 further comprising:
receiving a request to remove a plurality of keys from the plurality of probabilistic data structures;
identifying a probabilistic data structure in the plurality of probabilistic data structures such that the probabilistic data structure only stores the plurality of keys; and
modifying the status of the probabilistic data structure to indicate that the plurality of keys have been removed from the probabilistic data structure.

13. A computer-implemented method for performing a deduplication operation using a plurality of probabilistic data structures to represent a fingerprint database, the method comprising:
identifying, by a processor, a plurality of probabilistic data structures representing a fingerprint database comprising of a plurality of fingerprints and a plurality of offsets, the plurality of offsets identifying a location of a plurality of data blocks from which the plurality of fingerprints were generated, each probabilistic data structure being associated with at least one other probabilistic data structure in the plurality of probabilistic data structures, wherein the plurality of probabilistic data structures are associated to form a tree structure comprising a plurality of ordered levels, each level being associated with at least one of the plurality of probabilistic data structures, wherein each probabilistic data structure corresponds to a portion of a storage device storing the plurality of data blocks;
generating, by the processor, a fingerprint of a received data block to be deduplicated;
querying, by the processor, a first probabilistic data structure of the plurality of probabilistic data structures with the generated fingerprint to determine if the generated fingerprint exists in the first probabilistic data structure, and if the item exists in the first probabilistic data structure, then querying, by the processor, a second probabilistic data structure of the plurality of probabilistic data structures with the generated fingerprint to determine whether the generated fingerprint exists in the second probabilistic data structure;
receiving, by the processor, an offset identifying a location of a stored data block from the plurality of probabilistic data structures, if the generated fingerprint exists in the plurality of probabilistic data structures;
retrieving, by the processor, the stored data block from the location identified by the offset;
comparing, by the processor, the stored data block with the received data block to determine if the received data block is a duplicate of the stored data block; and
deduplicating, by the processor, the received data block if the received data block is a duplicate of the stored data block.

14. The method of claim 13, wherein each probabilistic data structure comprises a Bloom filter.

15. The method of claim 13, wherein a number of probabilistic data structures associated with each ordered level increases exponentially from level to level.

16. The method of claim 13, wherein each probabilistic data structure comprises a bit vector and at least one hash function.

17. The method of claim 16 wherein querying, by the processor, the plurality of probabilistic data structures further comprises querying, by the processor, each hash function of each probabilistic data structure with the item.

18. A system for storing and accessing data using a plurality of probabilistic data structures, the system comprising:
a storage device operative to store a dataset comprising of a plurality of values;
a memory operative to store a plurality of probabilistic data structures, each probabilistic data structure being associated with at least one other probabilistic data structure in the plurality of probabilistic data structures, wherein the plurality of probabilistic data structures are associated to form a tree structure comprising a plurality of ordered levels, each level being associated with at least one of the plurality of probabilistic data structures, wherein each probabilistic data structure corresponds to a portion of the storage device storing the dataset; and
a processor operatively connected to the memory and operative to:
generate a plurality of keys corresponding to the plurality of values;
insert each key of the plurality of keys into each probabilistic data structure that corresponds to the portion of the storage device storing the value the key was generated from;
store the plurality of probabilistic data structures in the memory; and
query a first probabilistic data structure of the plurality of probabilistic data structures with an item to determine whether the item exists in the first probabilistic data structure, and if the item exists in the first probabilistic data structure, then query the second probabilistic data structure of the plurality of probabilistic data structures with the item to determine whether the item exists in the second probabilistic data structure.

19. The system of claim 18, wherein the plurality of keys comprise a plurality of fingerprints and the plurality of values corresponds to a plurality of data blocks.

20. The system of claim 18, wherein each probabilistic data structure comprises a Bloom filter.

21. The system of claim 18 wherein the processor is further operative to store each key and an offset identifying a location of the corresponding value on the storage device with the probabilistic data structure in a last ordered level of the plurality of ordered levels which corresponds to the portion of the storage device storing the value.

22. The system of claim 18, wherein each probabilistic data structure comprises a bit vector and at least one hash function.

23. The system of claim 22 wherein the processor is further operative to insert each key into each hash function of each probabilistic data structure.

24. The system of claim 22 wherein the processor is further operative to query each hash function of each probabilistic data structure with the item.

25. The system of claim 22, wherein the item comprises a fingerprint generated from a received data block.

26. The method of claim 1 wherein associated probabilistic data structures correspond to a portion of the storage device storing the same dataset.

27. The method of claim 1 wherein the portion of the storage device corresponding to the second probabilistic data structure is a subset of the portion of the storage device corresponding to the first probabilistic data structure.

28. A computer-implemented method for storing and accessing data using a plurality of probabilistic data structures, the method comprising:
identifying, by a processor, a dataset comprising a plurality of values stored on a storage device;
assembling, by a processor, a plurality of probabilistic data structures, each probabilistic data structure being associated with at least one other probabilistic data structure in the plurality of probabilistic data structures, wherein the plurality of probabilistic data structures are associated to form a tree structure comprising a plurality of ordered levels, each level being associated with at least one of the plurality of probabilistic data structures, wherein each probabilistic data structure corresponds to a portion of the storage device storing the dataset, wherein ordering of the probabilistic data structures corresponds to ordering of the values;

generating, by the processor, a plurality of keys corresponding to the plurality of values;

inserting, by the processor, each key of the plurality of keys into each probabilistic data structure that corresponds to the portion of the storage device storing the value the key was generated from;

storing, by the processor, the plurality of probabilistic data structures in memory; and querying, by the processor, the plurality of probabilistic data structures with an item to determine whether the item exists in the first probabilistic data structure.

29. The method of claim 28 wherein the plurality of probabilistic data structures are stored in the memory in depth first order.

* * * * *